Aug. 9, 1949.　　　　H. H. MERWIN　　　　2,478,413
DISTRIBUTING APPARATUS
Filed Nov. 6, 1947　　　　　　　　　　3 Sheets-Sheet 2

INVENTOR
H. H. MERWIN
BY W. C. Parnell
ATTORNEY

Aug. 9, 1949.     H. H. MERWIN     2,478,413
DISTRIBUTING APPARATUS
Filed Nov. 6, 1947     3 Sheets-Sheet 3
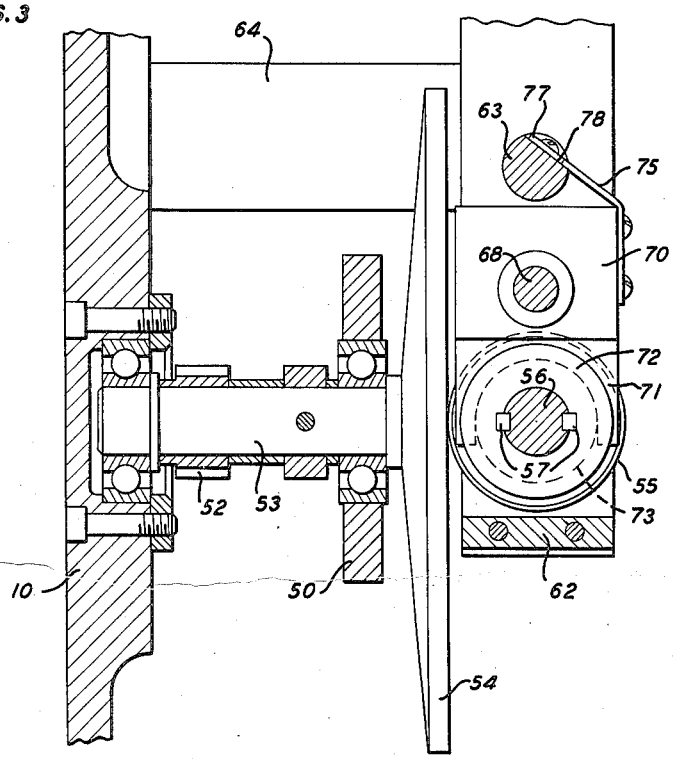
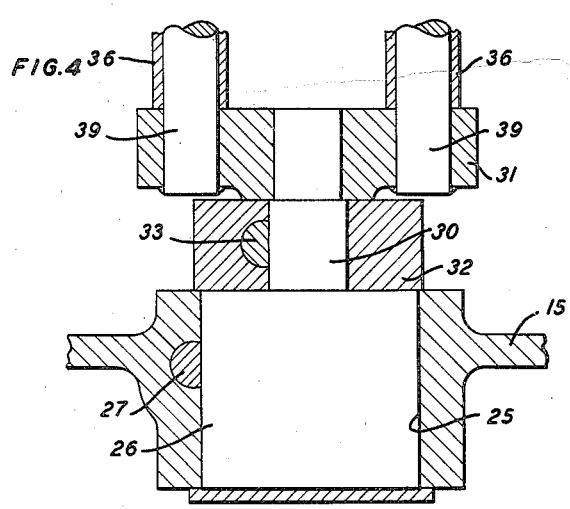
INVENTOR
H. H. MERWIN
BY
W. C. Parnell
ATTORNEY Patented Aug. 9, 1949

2,478,413

UNITED STATES PATENT OFFICE 2,478,413

DISTRIBUTING APPARATUS

Harry H. Merwin, Rutherford, N. J., assignor to Western Electric Company, Incorporated, New York, N. Y., a corporation of New York Application November 6, 1947, Serial No. 784,327

5 Claims. (Cl. 242—158)

1

This invention relates to distributing apparatus, and more particularly to distributing apparatus for stranding machines employed in the manufacture of switchboard cables.

Switchboard cable stranders are constructed to manufacture cables of various sizes and wind them on standard takeup reels mounted at the exit end of the machine. It is important that as much cable as possible be wound on the takeup reel and that the cable lie uniformly thereon. To accomplish this result, a distributing mechanism must be provided which can be varied with variations in the width of the cable, the conventional switchboard cables being of flat or oval cross-sectional contours. In distributing cables of various widths, the limits between which a distributor element is reciprocated must in some way be varied to start a layer of cable adjacent one head of the reel and continue laying the cable spirally on the reel until it reaches the other head thereof. Furthermore, variations in the size of the cable vary the speed in which one layer of the cable is completed upon the reel and for this reason the speed of movement of the distributing element must be varied to accomplish a uniform lay of the convolutions of material or cable on the reel.

An object of the invention is to provide a distributing apparatus which is highly variable both in speed of movement between given limits and in variations of the given limits with variations in the size of material, such as cable, to be wound on a takeup reel to cause a uniform lay of the material on the reel.

With this and other objects in view the invention comprises a distributing mechanism having a distributing element including spaced guides between which longitudinally advancing material may be distributed on the takeup reel, means being provided to effectively vary the distance between the guide members for variations in width of the material. Other means incorporated in the distributing element may be actuated to vary the given limits between which the material may be moved for distribution on the reel. An actuating member in the form of a double threaded screw causes reciprocation of the distributing element. A driving mechanism for the actuating member or screw is highly variable to drive the screw from zero movement to maximum speed depending upon the size of the material being advanced to the takeup reel.

More specifically, the features of the distributing apparatus include a distributing element supported for reciprocable movement and including spaced rollers between which cable of various widths may be advanced singly to the takeup reel. The guide rollers are carried by a member supported by a spindle upon which the member may be rocked in either direction to effectively move the rollers relative to the centerline of the path of the material depending upon the width of the material being advanced therebetween. Locking means is provided to secure the member and rollers on the spindle in the adjusted position. This structure is supported by a drum-like member in the main body of the distributing element, the spindle being disposed concentric with the axis of the drum-like member whereby partial rotation of the drum-like member in either direction will effectively vary the positions of the guide rollers with respect to the reel to vary the limits between which they are moved.

The driving mechanism for the actuating member or double threaded screw includes a train of gears connecting the screw to a friction disc which is driven by a friction roller. The friction roller is keyed to a shaft supported by a frame mounted on a pivot to be rocked thereon to move the friction roller into and out of engagement with the friction disc. The shaft, upon which the friction roller is keyed, is connected through gears to a power means or drive shaft.

Other objects and advantages will be apparent from the following detailed description when considered in conjunction with the accompanying drawings, wherein Fig. 1 is a top plan view of the apparatus shown in combination with a takeup reel, portions of the apparatus being shown in section;

Fig. 3 is an enlarged fragmentary sectional view taken along the line 3—3 of Fig. 2; and Fig. 4 is an enlarged fragmentary sectional view taken along the line 4—4 of Fig. 2.

Figure 1:
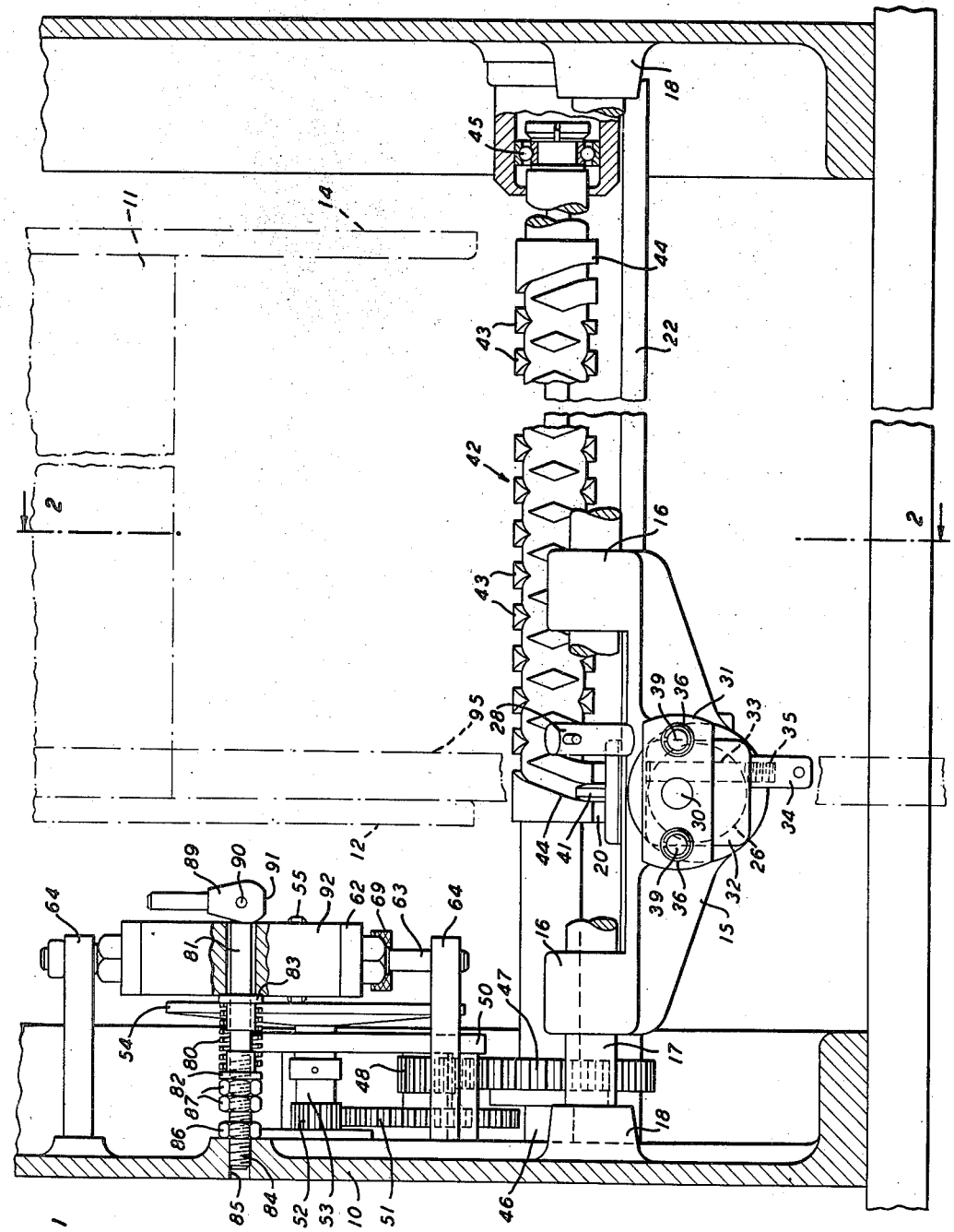

Referring now to the drawings, the apparatus in the present embodiment is a part of a cable stranding machine including a flyer frame 10 in which a takeup reel 11 is mounted in the conventional manner, whereby the heads 12 and 14 of the reel are at fixed positions within the flyer frame. The apparatus includes a distributing element 15 with apertured arms 16 mounted for reciprocation on a supporting rod 17, the ends of the rod being mounted in embossed members 18 of the frame 10. Another arm 20 of the element 15 carries a roller 21 which rides in a channel guide 22 supported by the frame 10 and disposed parallel with the bar 17. The main frame of the distributor element 15 has an aperture 25 therein to receive a drum-like member 26 which may be moved about its axis in either direction and locked in any desired position by a locking element 27, which is actuated by a nut-like member 28 (Fig. 2) mounted on the outer threaded end 29 of the locking element. A spindle 30 is carried by the drum-like member 26 at a fixed position eccentric with the axis of the drum-like member 26 as illustrated in Fig. 1. A member 31 fixed or integral with a collar 32 is mounted on the spindle 30 for rocking adjustment in either direction thereon and to be locked in any desired adjusted position by a locking element 33 which is similar to the locking element 27. A nut-like member 34 mounted on the outer threaded end 35 of the element 33 provides the means for actuating the locking element to lock the members 31 and 32 on the spindle 30. The member 31 is apertured near the ends thereof to receive and rigidly supports rods 39 which carry sleeve-like rollers 36, the rollers being held in place on their rods by retaining rings 37.

Figure 2:
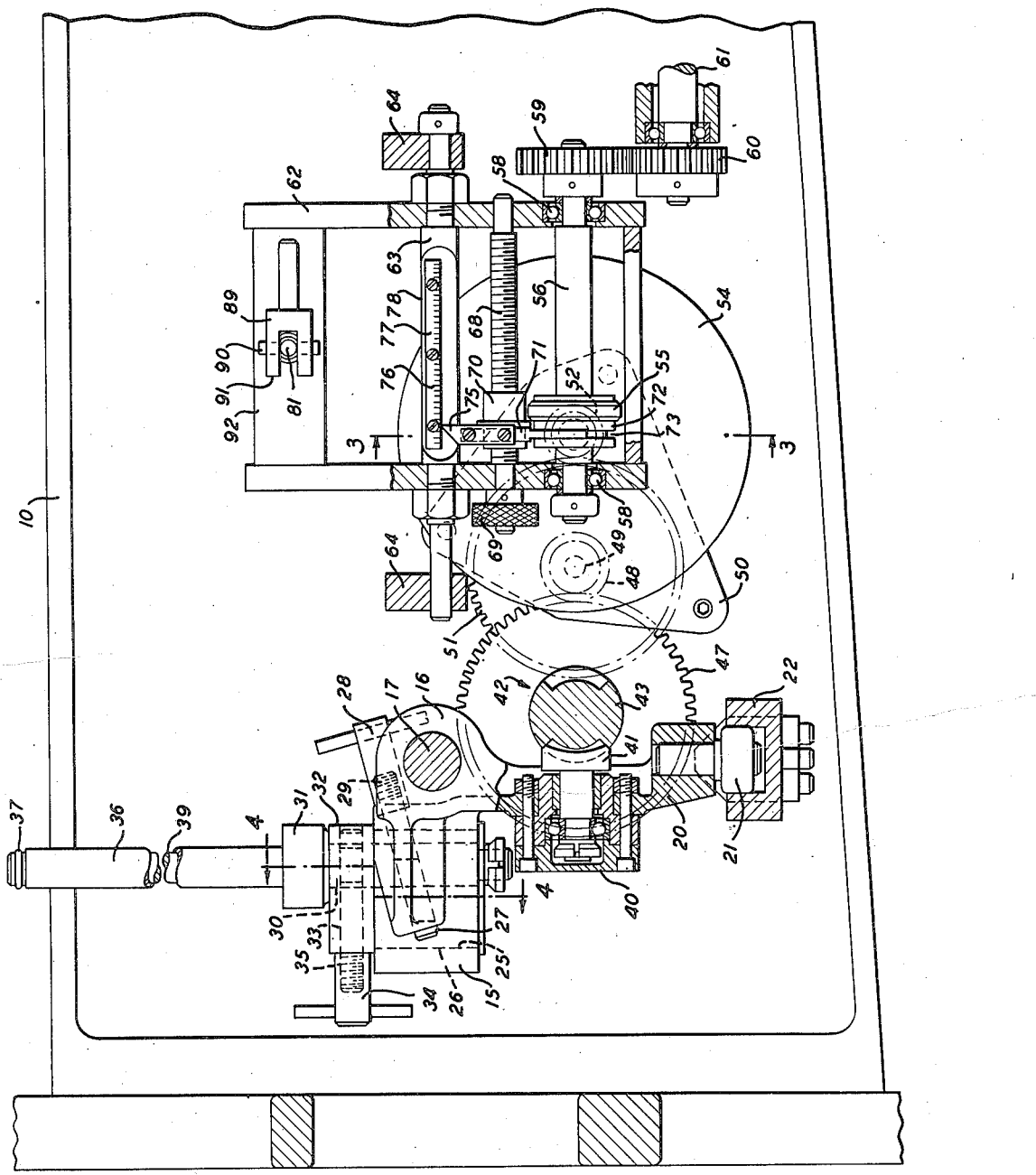
Fig. 2 is a horizontal sectional view of the apparatus.

The arm 20 of the distributing element as illustrated in Fig. 2 carries the conventional supporting mechanism 40 for a follower 41 which rides in the grooves or guideways of a double threaded screw or actuating member 42. The guideways of the screw are provided by the conventional guides 43 disposed along the main body of the screw between the reversing end guides 44 where the direction of the follower 41 is changed to cause it to travel in a reverse direction. One end of the screw 42 is supported in a bearing 45, the other end being supported in a bearing 46 and carrying a gear 47. The gear 47 interengages a pinion 48 which is mounted upon a shaft 49 with a gear 51. The shaft 49 is supported in suitable bearings (not shown) carried by the main frame 10 and a parallel bracket 50 supported thereby. The gear 51 interengages the pinion 52 which is mounted on a shaft 53 journalled in suitable bearings as shown in Fig. 3 and mounted in the frame 10 and the bracket 50. A friction disc or wheel 54 is mounted on the inner end of the shaft 53, the diameter of the friction wheel being of sufficient size to cause a high degree of variation in the speed of rotation of the screw 42. A friction roller 55 is mounted for axial movement on a shaft 56 and is keyed thereto at 57 as illustrated in Fig. 3. The shaft 56 is journalled in bearings 58 and has a gear 59 mounted on one of its ends. The gear 59 is positioned to interengage a gear 60 on a drive shaft 61 which constitutes the power means for the driving mechanism leading to the screw 42.

The bearings 58 are mounted in a frame 62 which is supported for rocking movement on a shaft 63, the ends of which are journalled in brackets 64 mounted at fixed positions in the frame 10.

The means for moving the friction roller 55 relative to the friction disc 54 and holding the roller in any selected position includes an adjusting screw 68, rotatably supported in apertures of the frame 62 and having a hand wheel 69 mounted on one end thereof by the aid of which the screw may be rotated. A threaded element or nut 70 is disposed upon the screw 68 to be moved thereon in either direction by rotation of the screw. A yoke 71 fixedly mounted on the threaded element 70 straddles a grooved collar 72 of the friction roller 55 and is disposed in a groove 73 thereof to form a connection with the friction roller whereby the roller is free to rotate, but is maintained at a position on the shaft 56 determined by the location of the threaded element 70 and the yoke 71. A pointer 75 carried by the threaded element 70 extends diagonally therefrom as illustrated in Fig. 3 to register with indications 76 on a scale 77 which is mounted in a cutaway portion 78 of the pivot rod 63. The indications 76 represent the speed of rotation or the revolutions per minute of the actuating member or double threaded screw 42. In this manner, the operator may readily adjust the position of the friction roller 55 relative to the friction disc 54 depending upon the size of cable advancing through the machine.

The friction roller 55 is forced into engagement with the friction disc 54 when in operating position by the energy stored in a spring 80 (Fig. 1). The spring 80 is disposed concentric with a rod 81 and positioned between collars 82 and 83 which are movably disposed on the rod. One end of the rod 81 is threaded as at 84 and is adjustably disposed in a threaded aperture 85 of the main frame 10 of the flyer. A nut 86 locks the rod 81 in its adjusted position in the frame 10. Lock nuts 87 disposed on the threaded portion 84 of the rod 81 cooperate to adjust the spring 80 to vary the force embodied therein and to maintain this adjustment of the spring. A cam lever 89 (Figs. 1 and 2) is formed to straddle the opposite end of the rod 81 from its threaded end 84 and is pivotally connected thereto by a pin 90 extending through the rod 81 and both legs of the lever 89. The contour of the lever 89, as illustrated in Fig. 1, is such that when in the position shown in Fig. 1, the frame 62 will be free to allow the force of the spring 80 to rock it about its pivot rod 63 to force the friction roller 55 into intimate engagement with the friction disc 54. Movement of the lever 89 into alignment with the rod 81 to position a flattened end 91 into engagement with a cross member 92 of the frame 62 will rock the frame about the pivot rod 63 against the force of the spring 80 to move the friction roller 55 free of the friction disc 54 and disconnect the mechanism which otherwise operatively connects the power means, namely the drive shaft 61 to the actuating member or double threaded screw 42.

In preparing the apparatus for operation, the operator first determines the size of the material or cable 95 which is to be wound upon the takeup reel 11. The guide rollers 36 are then adjusted by loosening the locking element 27 to free the member 26 for rocking movement in either direction to move the guide rollers 36 relative to the reel head 12 to cause the first convolution of each layer of material or cable to lay closely adjacent this head of the reel. At the same time, another adjustment is made in the guide rollers by loosening the locking element 33 to free the members 31—32 for rocking movement on the spindle to locate the guide rollers relative to the centerline of the path of the cable until they are close by the sides of the cable. It is important to make these adjustments simultaneously as adjustment of the member 26 subsequent to an adjustment of the members 31—32 will disrupt the first adjustment of the guide rollers. When these adjustments have been made the locking elements 27 and 33 may be tightened to maintain the members in the adjusted positions.

The operator next determines the speed of rotation of the screw 42 to move the distributing element 15 at a given speed depending upon the size of the material being advanved to the takeup reel. It will be apparent that in distributing narrow material on the reel, the distributing element must travel at a slower rate of speed than is necessary to distribute wider material on the reel. The required speeds for the different widths of the material are determined by the scale 77 and before the machine is started, the friction roller 55 may be adjusted relative to the friction disc 54, moving the roller toward or away from the axis of the friction disc, a distance determined by the scale 77, the adjustment continuing until the pointer 75 registers with the proper indication 76. This adjustment is made after the frame 62 has been rocked about its pivot 63 to free the friction roller 55 from the friction disc 54. After the adjustment has been completed, the cam lever 89 is returned to the position shown in Figs. 1 and 2 and the apparatus is in readiness for operation. During operation of the apparatus, the power means or drive shaft 61 drives the shaft 56 through the gears 60 and 59 driving the friction roller 55, which in turn drives a friction disc 54. The shaft 52, driven by the friction disc 54, will drive the actuating member or double threaded screw 42 through the train of gears 52, 51, 48 and 47. The screw 53 is rotated constantly at the selected speed and in a given direction to cause the distributing element 15, through the follower 41, to be reciprocated at a predetermined variable speed between selectively variable limits to uniformly distribute the material 95 on the takeup reel 11. The apparatus continues its operation until the reel 11 is full and repeated operations may be made without further adjustments as long as material of the same width is advanced to takeup reels mounted singly in the machine. In other words, adjustments are required only when the machine is to manufacture a different type of cable or material of a different size.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A distributing apparatus for distributing materials of different sizes singly on a takeup reel, the distributing apparatus comprising a distributing element, mounted for reciprocation, a spindle carried by the element, a member mounted on the spindle, spaced guides carried by the member to straddle the path of materials of various sizes advancing singly toward the takeup reel, and means to lock the member in any desired adjusted position about the axis of the spindle to vary the positions of the guides relative to the path with variations in the sizes of the materials to control the uniform distribution of the materials singly on the reel.

2. A distributing apparatus for distributing materials of different sizes singly on a takeup reel, the distributing apparatus comprising a distributing element mounted for reciprocation between given limits, a supporting member carried by the distributing element and movable relative thereto about a given axis, a guiding member, having spaced material guide fingers, mounted on the supporting member at a position spaced a given distance from the said axis, and means to lock the supporting member in any selected position in the distributing element to position the guide member relative to the takeup reel to vary the given limits between which the material guide fingers are reciprocated with the distributing element.

3. A distributing apparatus for distributing materials of different sizes singly on a takeup reel, the distributing apparatus comprising a distributing element mounted for reciprocation between given limits, a supporting member carried by the distributing element and movable relative thereto about a given axis, a guiding member, having spaced material guide fingers, mounted on the supporting member at a position spaced a given distance from the said axis, means to lock the supporting member in any selected position in the distributing element to position the guide member relative to the takeup reel to vary the given limits between which the material guide fingers are reciprocated with the distributing element, and means whereby the guiding member is rockable on its mounting relative to the supporting member and relative to the path of the materials advancing singly to the takeup reel to vary the positions of the guide fingers relative to the materials with variations in the sizes of the materials.

4. A distributing apparatus for distributing materials of different sizes singly on a takeup reel, the distributing apparatus comprising a distributing element, mounted for reciprocation, spaced guides carried by the element to straddle the path of materials of various sizes advancing singly toward the takeup reel, a rotatable actuating member to cause reciprocable movement of the distributing element between given limits to distribute the material on the takeup reel, a power means, a friction roller driven by the power means, a friction disc operatively connected to the actuating member and driven by the friction roller, means to vary the position of the point of engagement of the friction roller with the friction disc relative to the axis of the friction disc to vary the speed of rotation of the actuating member during advancement of materials of different sizes singly at a given speed to cause the distributing element to lay the material uniformly on the reel, and means actuable with the varying means for the friction roller to indicate the positions for the friction roller for predetermined speeds of rotation of the actuating member.

5. A distributing apparatus for distributing materials of different sizes singly on a takeup reel, the distributing apparatus comprising a distributing element, mounted for reciprocation, spaced guides carried by the element to straddle the path of materials of various sizes advancing singly toward the takeup reel, a rotatable actuating member to cause reciprocable movement of the distributing element between given limits to distribute the material on the takeup reel, a power means, a friction roller driven by the power means, a friction disc operatively connected to the actuating member and driven by the friction roller, means to vary the position of the point of engagement of the friction roller with the friction disc relative to the axis of the friction disc to vary the speed of rotation of the actuating member during advancement of materials of different sizes singly at a given speed to cause the distributing element to lay the material uniformly on the reel, spring means to force the friction roller into intimate engagement with the friction disc, and means to actuate against the force of the spring means to move the friction roller free of the friction disc.

HARRY H. MERWIN.

REFERENCES CITED

The following references are of record in the file of this patent:

UNITED STATES PATENTS

| Number | Name | Date |
|---|---|---|
| 887,277 | Shinn | May 12, 1908 |
| 1,338,329 | Rhoades | Apr. 27, 1920 |
| 1,652,050 | Robins | Dec. 6, 1927 |
| 1,797,331 | Dale | Mar. 24, 1931 |
| 2,224,416 | Voit et al. | Dec. 10, 1940 |
| 2,254,220 | Hubbard | Sept. 2, 1941 |
| 2,407,542 | Ewaldson | Sept. 10, 1946 |